(12) United States Patent
Gerakios et al.

(10) Patent No.: US 6,706,085 B2
(45) Date of Patent: Mar. 16, 2004

(54) FILTER BAG CAGE

(75) Inventors: Michael Gerakios, Avoca Beach (AU); Paul Bowden, Bonnells Bay (AU); Ray Moeser, Killarney Vale (AU)

(73) Assignee: Albany International Corp., Albany, NY (US)

( * ) Notice: Subject to any disclaimer, the term of this patent is extended or adjusted under 35 U.S.C. 154(b) by 0 days.

(21) Appl. No.: 10/104,043

(22) Filed: Mar. 22, 2002

(65) Prior Publication Data

US 2003/0177744 A1 Sep. 25, 2003

(51) Int. Cl.$^7$ .............................................. B01D 46/08
(52) U.S. Cl. ............................ 55/378; 55/379; 55/381; 55/382; 55/302; 55/486; 55/492; 55/524; 55/528; 55/529
(58) Field of Search .......................... 55/378, 379, 381, 55/382, 302, 486, 492, 524, 528, 529

(56) References Cited

U.S. PATENT DOCUMENTS

| | | | | |
|---|---|---|---|---|
| 3,853,509 A | * | 12/1974 | Lewaert | 55/379 |
| 3,948,291 A | * | 4/1976 | Persson | 55/379 |
| 4,259,095 A | * | 3/1981 | Johnson, Jr. | 55/379 |
| 4,324,571 A | * | 4/1982 | Johnson, Jr. | 55/379 |
| 4,363,643 A | | 12/1982 | Elbrader et al. | |
| 5,096,473 A | * | 3/1992 | Sassa et al. | 28/528 |
| 5,173,098 A | * | 12/1992 | Pipkorn | 55/379 |
| 5,246,474 A | * | 9/1993 | Greatorex | 55/381 |
| 5,800,580 A | * | 9/1998 | Feldt | 55/379 |
| 5,858,039 A | * | 1/1999 | Schumann et al. | 55/379 |
| 5,871,645 A | | 2/1999 | Reed et al. | |
| 5,885,314 A | | 3/1999 | Oussoren et al. | |
| 5,928,414 A | | 7/1999 | Wnenchak et al. | |
| 5,948,257 A | * | 9/1999 | Custer et al. | 40/500.26 |
| 5,951,726 A | | 9/1999 | Allingham et al. | |
| 5,958,096 A | | 9/1999 | Yee et al. | |
| 6,036,735 A | * | 3/2000 | Carter et al. | 55/524 |

FOREIGN PATENT DOCUMENTS

| | | |
|---|---|---|
| CH | 217728 A | 11/1941 |
| DE | 7218508 U | 10/1972 |
| DE | G 94 09 704.60 | 6/1994 |
| FR | 908627 A | 4/1946 |
| SE | 1051555 C | 8/1942 |

OTHER PUBLICATIONS

International Search Report issued by European Patent Office for corresponding international application PCT/US03/07753, mailed Jul. 7, 2003.

* cited by examiner

*Primary Examiner*—Minh-Chau T. Pham
(74) *Attorney, Agent, or Firm*—Frommer Lawrence & Haug LLP; Ronald R. Santucci

(57) ABSTRACT

A filter assembly for filtering particulates out of a stream of gas, which includes an elongated filter bag made out of fabric with a plurality of pleats intermediate its ends with a support cage made from a plurality of wires on the outside of the bag having portions thereof disposed in the pleats.

20 Claims, 6 Drawing Sheets

456mm perimeter (14% decrease)
20mm OD, 10mm ID, 80mm centre

738mm perimeter (40% increase)
10mm OD & ID, 70mm centre

896mm perimeter (69% increase)
10mm OD & ID, 80mm centre

FILTER BAG CAGE

FIELD OF THE INVENTION

The present invention is directed towards a filter and filter bag cage, particularly, a filter/cage arranged for use in industrial applications.

BACKGROUND OF THE INVENTION

Filters have had wide commercial applications and utility in commercial industries. Filters generally involve the use of a filter media which, depending upon its construction, may or may not require a supporting structure. For example, filters made from a woven or non-woven textile material are often supported by way of wire cages. Filters can take on a variety of shapes. For example, as set forth in German Utility Model G 94 09 704.6, the disclosure of which is incorporated herein by reference, a filter bag is shown having a star shape. The filter support is also shown having a star shape about which the filter media is supported. The support is made typically from a wire made of metal or other suitable material. The filter is intended to remove particulate matter from a gas stream which flows from the outside of the filter into the filter with the particulate accumulated on the outside of the filter.

The particulate is then collected in a hopper at the base of the filter system. Due to the shape of the filter media, it provided for increased surface area for filtering compared to that of typically cylindrical bag filters.

Improvements upon such filter arrangements can be found in U.S. Pat. No. 5,951,726, the disclosure of which is incorporated herein by reference. In this patent a modular filter bag cage is described. As noted therein, such filters and their support members can be relatively large (i.e. 20–30 feet or more in length) depending upon the application. Thus, while the filter media may be folded for transportation or storage, etc., the cage, if rigidly constructed, did not have such an advantage. Accordingly, by making the cage modular in construction, provided for ease in storage, transportation, etc., and was readily assembled on site.

In certain applications, particularly power generating stations, foam coated filter media has been utilized on the inside surface which avoids contact with any supporting structure. These filters are used in gas solid separation such as flue gas filtration. These filters are typically cylindrical in construction and are used without cages, since the gas flow is from the inside of the filter and out, with an open end down and closed end up. The filter is subject to shaking to dislodge the dust which accumulates on the inside surface which is then collected.

Since such filters are used in large scale operations, their efficiency is important and has a significant effect on operating costs. Accordingly, there exists a need and a desire to improve the operation of such filters whilst avoiding in doing so the need to structurally modify the internal apparatus of the bag house in which they are employed.

SUMMARY OF THE INVENTION

It is therefore a principal object of the invention to provide for a filter which has improved operation efficiency.

It is a further object of the invention to provide for such a filter which provides for such efficiency without the need to modify the internal apparatus of the bag house in which it is used.

A yet further object of the invention is to provide such a filter which provides for increased operating capacity at a lower operating cost.

A still further object of the invention is to provide a filter which is versatile and may be modular in construction.

These and other objects and advantages are provided by the present invention. In this regard, the filter assembly provided includes a filter bag cage along with a corresponding filter. The filter assembly is intended to be used in a filtering apparatus or containment vessel. A plurality of filters are contained in the apparatus, usually positioned side by side extending upwardly from an inlet port or ports which feeds the gas stream which is to be filtered. The top of the filter assembly is typically capped so that the gas is filtered from the inside out with the particulate accumulating on the inside of the filter bag. The filter bag is provided with a plurality of pleats about its circumference. Its circumference is substantially the same as the cylindrical filters heretofore utilized and provides a ready replacement thereof. A filter bag cage is provided which is made of metal wire. The cage includes a plurality of wires which extend longitudinally while also extending radially inwardly so as to be positioned within the folds of the pleats. The cage serves to support the filter media including, particularly maintaining the pleated configuration. Due to the pleated arrangement, the filtration area is increased dramatically. This provides for improved operating efficiency.

In addition, the cage may be modular in construction such as that disclosed in the aforesaid United States Patent.

BRIEF DESCRIPTION OF THE DRAWINGS

Further objects and advantages of the invention will become apparent from the following description and claims and from the accompanying drawings wherein:

BRIEF DESCRIPTION OF THE PREFERRED EMBODIMENT

Figure 1:
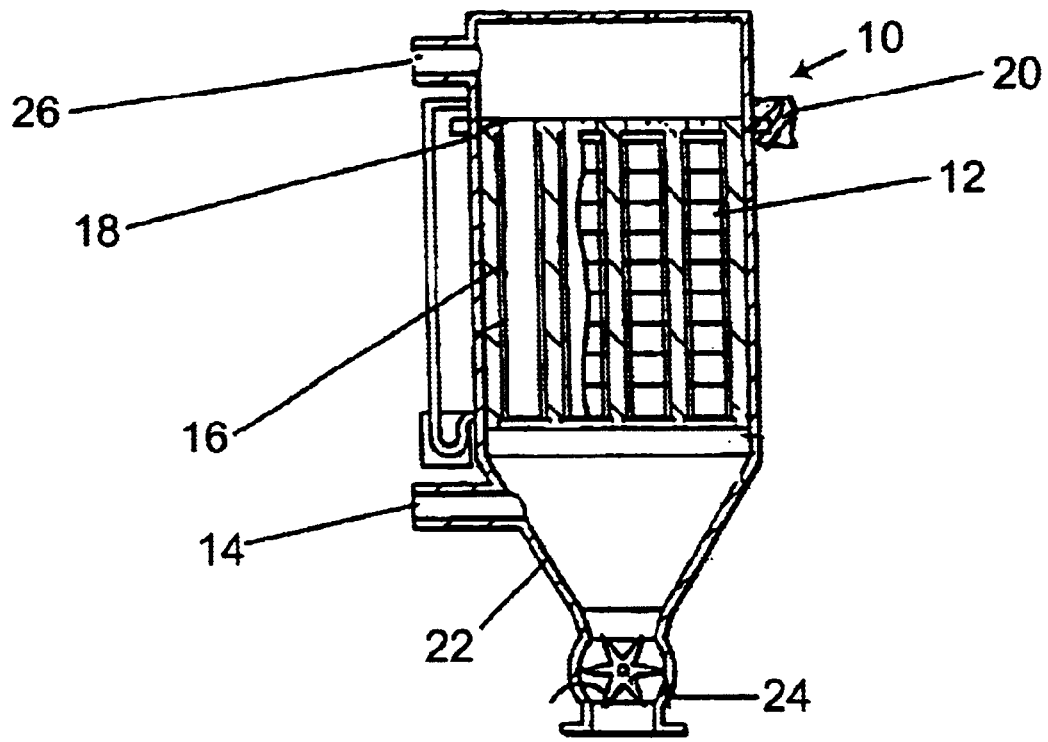
FIG. 1 is a side sectional view of a typical filter bag application which may incorporate either prior art filter bags or the filter assembly of the present invention.
Figure 2:
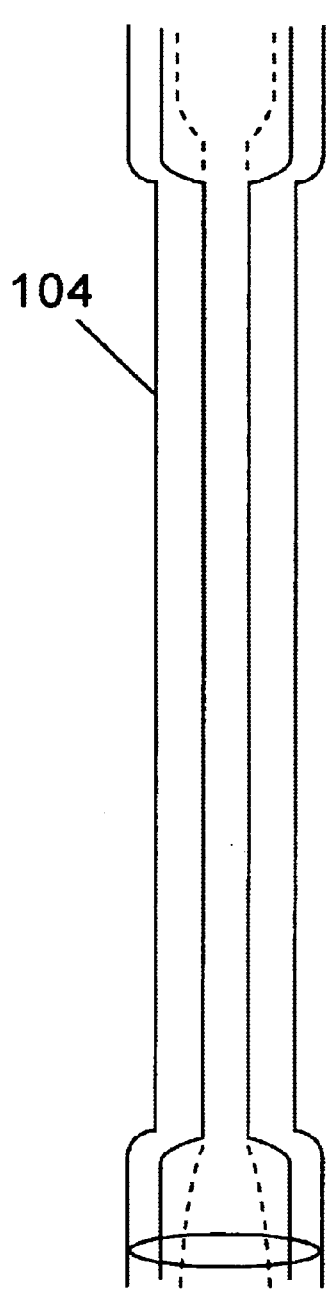
FIG. 2 is a side view of the filter bag cage, incorporating the teachings of the present invention.
Figure 3:
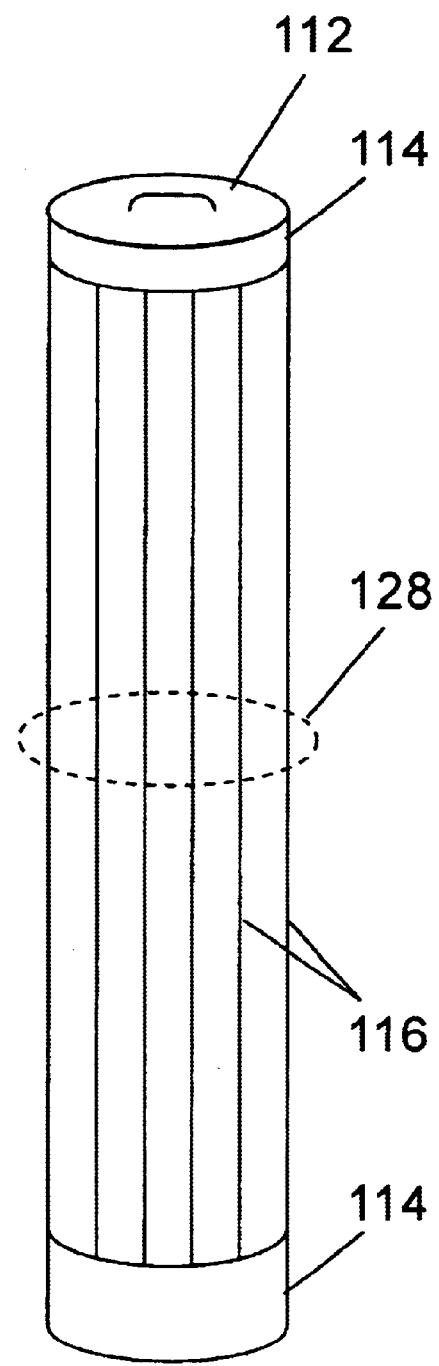
FIG. 3 is a side view of the filter bag, incorporating the teachings of the present invention.
Figure 4A:
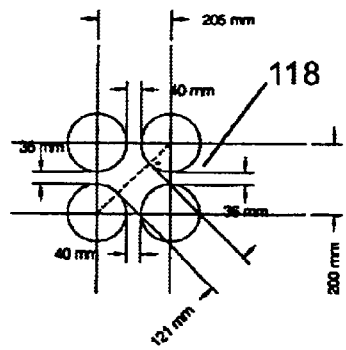
FIGS. 4A–4D show general illustrations of the filter bag, incorporating the teachings of the present invention.
Figure 4B:
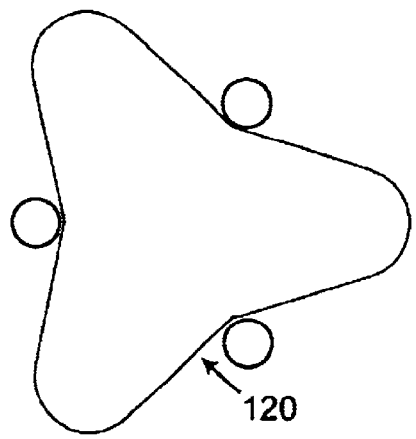
Figure 4C:
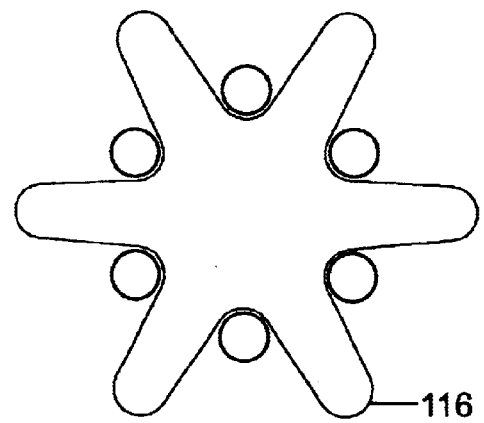
Figure 4D:
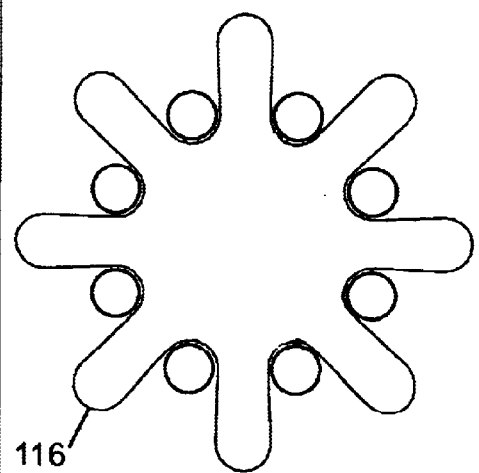
Figure 5:
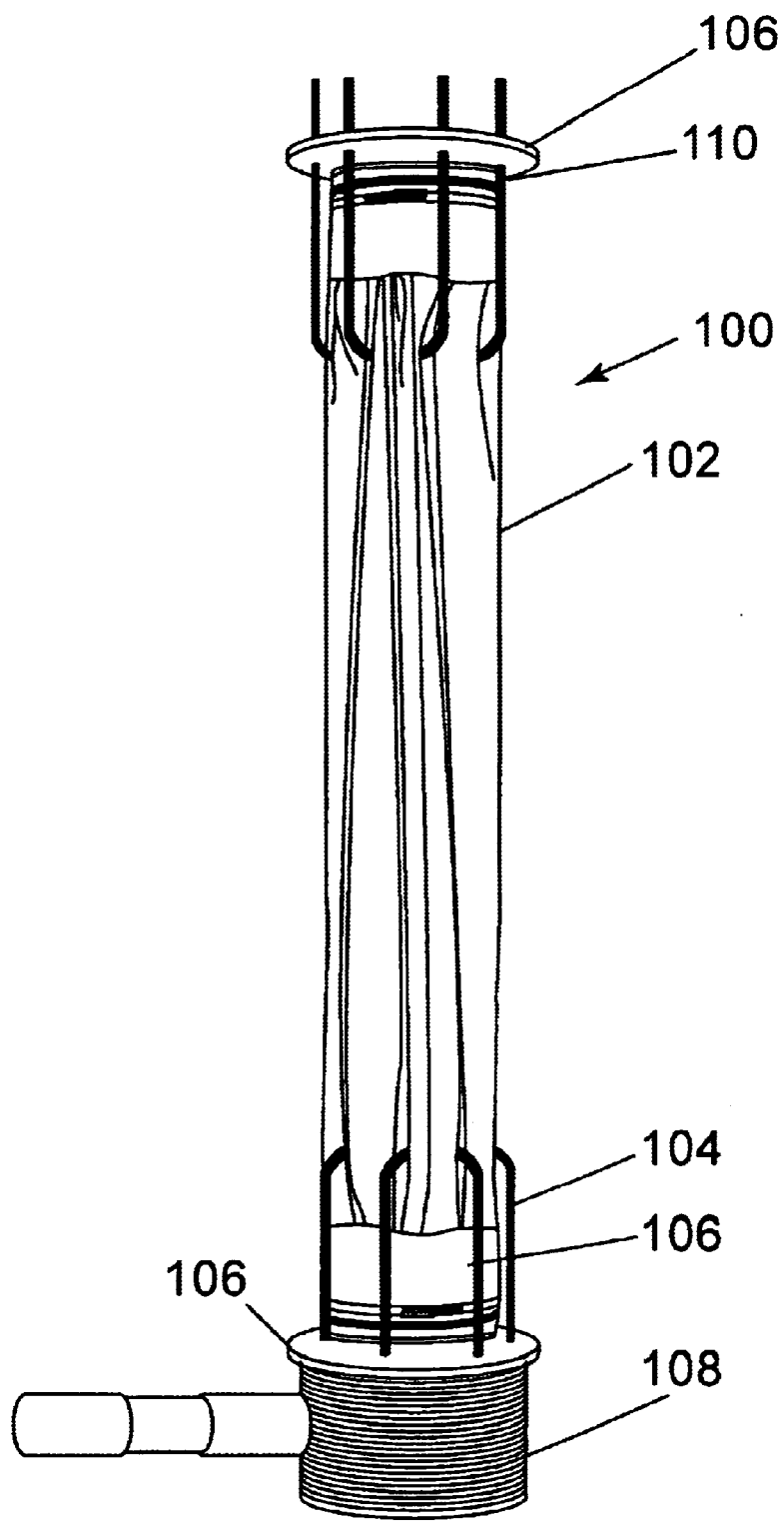
FIG. 5 is a perspective view of the filter bag assembly, incorporating the teachings of the present invention.
Figure 6:
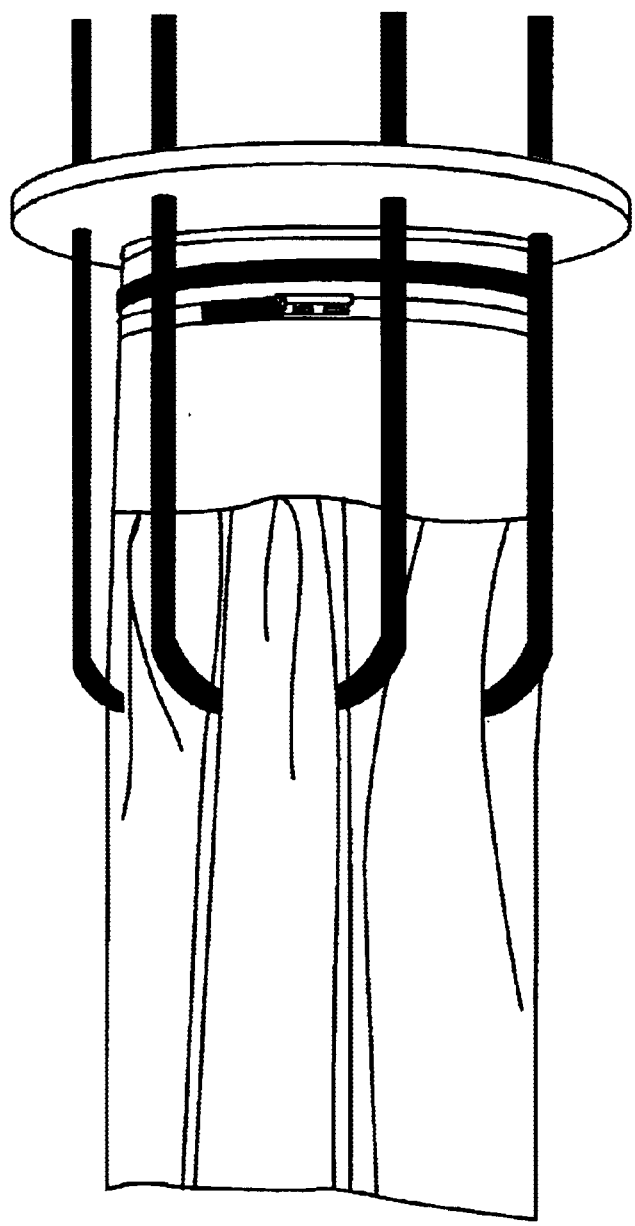
FIG. 6 is a perspective view of the top portion of the filter bag assembly, incorporating the teachings of the present invention.
Figure 7:
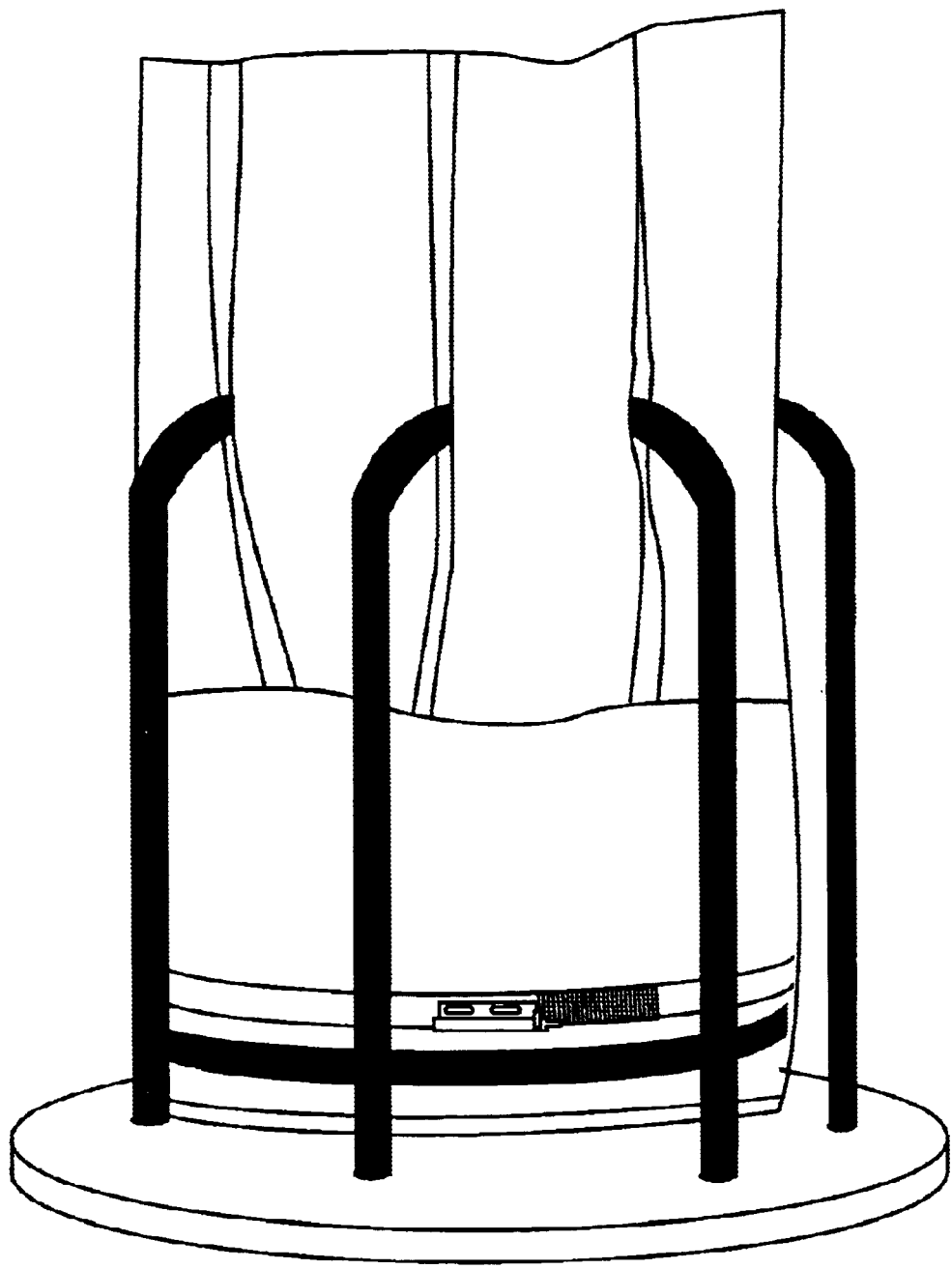
FIG. 7 is a perspective view of the bottom portion of the filter bag assembly, incorporating the teachings of the present invention.

Turning now more particularly to the drawings, the filter bag assembly of the present invention has wide spread industrial application. For illustrative purposes FIG. 1 generally shows one of such applications. In this regard what is shown is a containment vessel 10 having a plurality of filter bags 12. The particulate gas stream to be filtered enters via inlet port 14 and communicates with the interior 16 of the filter bags 12. The top 18 of the filter bags 12 are capped or closed with the filter bag being coupled to a shaker device generally designated 20. The gas stream passes from the inside surface to the outside surface of the filter bag 12 causing an accumulation of particulate on the inside of the bag which, due to the shaking, pulsing, flexing, etc., thereof by the shaker device 20, drops down into an accumulation hopper 22 which is removed by sweeper 24. The filter gas which passes to the outside of the filter bag communicates with an outlet port 26 and is then discharged.

Turning now more particularly to FIGS. 2 through 7, where like parts will be similarly numbered, the filter assembly 100 comprises a filter bag 102 and supporting cage 104. The filter bag 102 is made of fabric, preferably woven but can be non-woven, laminate, foam coated or coated with polymeric or metallic material having a high or low melting temperature depending upon the particular application, which is then possibly further processed by attaching a fibrous batt layer by needling. The bag 102 is cylindrical having an open end 106 which is clamped to an inlet port 108 to receive the gas to be filtered. Its opposite end 110 is closed and secured about an end cap 112. Each end 106 and 110 is provided with a cuff 114 of fabric which is of a diameter which is sufficient to circumscribe the inlet port 108 and end cap 112. Intermediate the cuffs 114 are a plurality of pleats 116. The pleats 116 add to the surface area of the filter bag 102 for filtration. The bag 102 can take on a variety of shapes such as those shown in FIGS. 4A through 4D. In this regard, the bag can be x-shaped 118 as shown in FIG. 4A. Alternatively, it can be somewhat triangular shaped 120 as shown in FIG. 4B. It might also be star shaped 122 having a plurality of pleats 116: six in FIG. 4C or eight in FIG. 4D. The gas flow is intended to be from inside out. A support cage 104 is provided, the configuration of which will depend upon the configuration of the filter bag 102. The cage 104 can be made of metal wire 124 and can be modular in construction as set forth in the aforesaid patent. The wires 124 are disposed on the outside of the bag 102 in the pleats 116 and serve to maintain the shape of the bag 102. The wires 124 are at a larger distance in the cuff 114 area at the top and bottom of the filter bag 102 and are bent inward at the pleat 116 area.

The wires 124 can be affixed at each end to a support member 126. They may alternatively be clamped or hinged to the end cap 112 or inlet port 108 or affixed in any other manner suitable for the purpose. The inner diameter defined by the wires 124 can be that which conforms to that for the particular application. A band or bands 128 may be provided about the filter bag 102 along its length. The end cap 112 may be coupled to a shaking device 20 to allow for the periodic shaking of the filter assembly 12 so as to dislodge the accumulated particulate on the inside of the bag 102. The bag 102 can be properly tensioned through the clamping thereof which is not interfered with by the cage 104.

The increase in the filtration area has a major beneficial effect on the operation of the filter. It provides for a lower operating cost (less fan amperage power); lower differential pressure (larger operating window), increased volume of flue gas capacity; and offset higher inlet temperature by handling more attemperating (cooling) air without upsetting the air to filter area ratios.

Thus by the present invention, its objects and advantages are realized, and although a preferred embodiment has been disclosed and described in detail herein, its scope should not be limited thereby; rather its scope should be determined by that of the appended claims.

What is claimed is:

1. A filter bag assembly comprising:
    an elongated filter bag having a top end and a bottom end and an inside surface and an outside surface;
    a plurality of pleats in said filter bag between its top end and bottom end;
    a filter bag cage comprising a plurality of elongated wires having a top end and a bottom end; said wires being supported at the top end and bottom end and being positioned only on the outside of the bag and within said pleats; and
    said filter bag having an inlet to receive a gas stream to be filtered which passes from the inside surface to the outside surface.

2. A filter bag assembly in accordance with claim 1 which includes an inlet being located at the bottom end of the filter bag and an end cap being affixed to and closing off said top end of the filter bag.

3. A filter bag assembly in accordance with claim 2 wherein said filter bag is made from fabric and has a shape taken from the group consisting of an x-shape, triangular shape, or star shape defined by a plurality of pleats.

4. A filter bag assembly in accordance with claim 1 wherein said filter bag cage comprises a plurality of metal wires.

5. A filter bag assembly in accordance with claim 3 wherein said filter bag cage comprises a plurality of metal wires.

6. A filter bag assembly in accordance with claim 4 wherein said filter bag cage is modular in construction.

7. A filter bag assembly in accordance with claim 5 wherein said filter bag cage is modular in construction.

8. A filter bag assembly in accordance with claim 1 wherein the filter bag is made from the group comprising woven or non-woven fabric, a laminate or a foam coated fabric.

9. A filter bag assembly in accordance with claim 8 wherein the fabric is coated with a polymeric or metallic coating of high or low melt material.

10. A filter bag assembly in accordance with claim 8 wherein said filter bag comprises a layer of batt.

11. A filter bag assembly comprising:
    an elongated filter bag having a top end and a bottom end and an inside surface and an outside surface;
    a plurality of pleats in said filter bag between its top end and bottom end;
    a filter bag cage comprising a plurality of elongated wires having a top end and a bottom end; said wires being supported at the top end and bottom end and extending longitudinally on the outside of the bag while also extending radially inwardly so to be positioned within the pleats; and
    said filter bag having an inlet to receive a gas stream to be filtered which passes from the inside surface to the outside surface.

12. A filter bag assembly in accordance with claim 11 which includes an inlet being located at the bottom end of the filter bag and an end cap being affixed to and closing off said top end of the filter bag.

13. A filter bag assembly in accordance with claim 12 wherein said filter bag is made from fabric and has a shape taken from the group consisting of an x-shape, triangular shape, or star shape defined by a plurality of pleats.

14. A filter bag assembly in accordance with claim 11 wherein said filter bag cage comprises a plurality of metal wires.

15. A filter bag assembly in accordance with claim 13 wherein said filter bag cage comprises a plurality of metal wires.

16. A filter bag assembly in accordance with claim 14 wherein said filter bag cage is modular in construction.

17. A filter bag assembly in accordance with claim 15 wherein said filter bag cage is modular in construction.

18. A filter bag assembly in accordance with claim 11 wherein the filter bag is made from the group comprising woven or non-woven fabric, a laminate or a foam coated fabric.

19. A filter bag assembly in accordance with claim 18 wherein the fabric is coated with a polymeric or metallic coating of high or low melt material.

20. A filter bag assembly in accordance with claim 18 wherein said filter bag comprises a layer of batt.

* * * * *